United States Patent
Schmidt

[15] 3,641,642
[45] Feb. 15, 1972

[54] INDIVIDUAL TOOTH BROACH
[72] Inventor: Frederick W. Schmidt, 19 Windmill Hill Road, Branford, Conn. 06405
[22] Filed: Dec. 30, 1969
[21] Appl. No.: 889,088

Related U.S. Application Data
[63] Continuation-in-part of Ser. No. 716,919, Mar. 28, 1968, Pat. No. 3,528,154.

[52] U.S. Cl. .................................................. 29/95.1, 29/106
[51] Int. Cl. ............................................................ B26d 1/00
[58] Field of Search ............................................ 29/106, 95.1

[56] References Cited

UNITED STATES PATENTS

Re.24,284  3/1957  Kopec ................................... 29/95.1
1,440,933  1/1923  Perkins et al. ......................... 29/95.1

Primary Examiner—Harrison L. Hinson
Attorney—Fishman and Van Kirk

[57] ABSTRACT

In the present invention a form broach is composed of a number of individual interlocking cutting elements which combine in an interdependent relationship to create the form broach. Each individual cutting element in the broach alignment interlocks with a neighboring cutting element by a male and female V-groove interlock structure which forms a part of each tooth in the assembly. Each individual cutting element is provided with an oil-distributing channel which may also have branches extending therefrom, and the ram body in which the assembled broach is housed contains an oil-distributing slot communicating with the grooves in the individual cutting elements.

17 Claims, 10 Drawing Figures

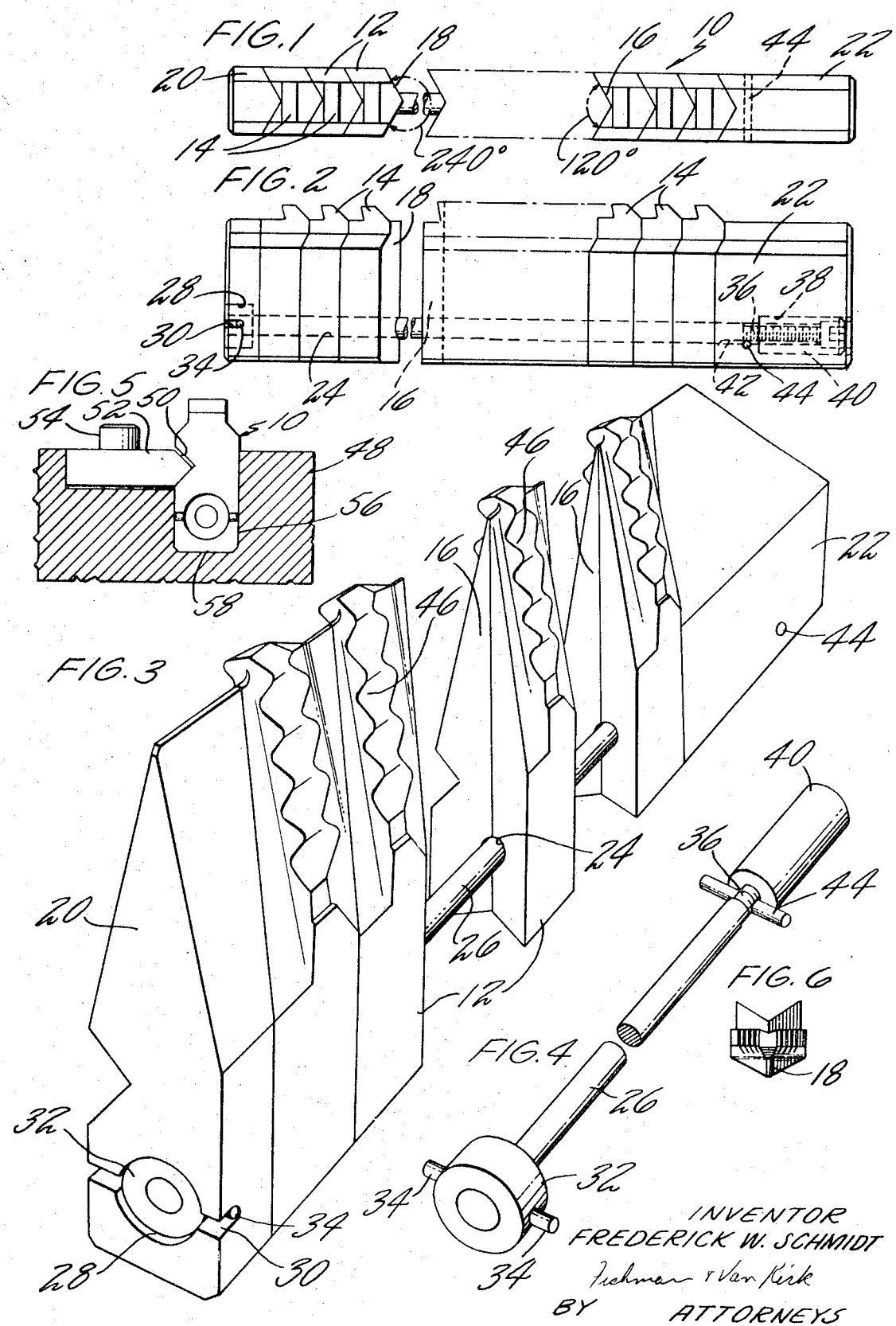

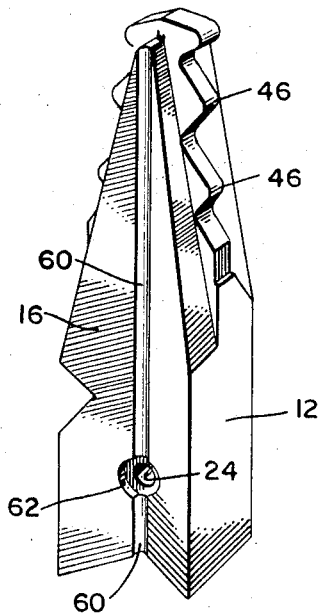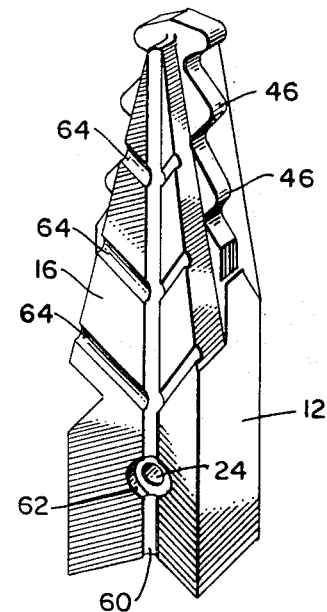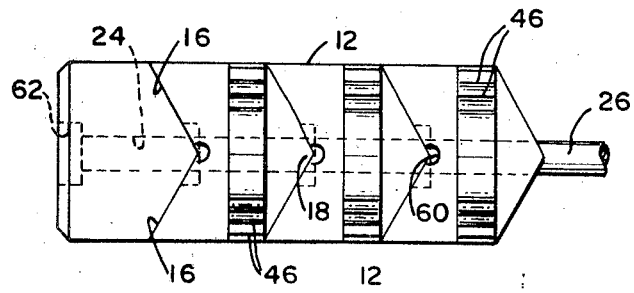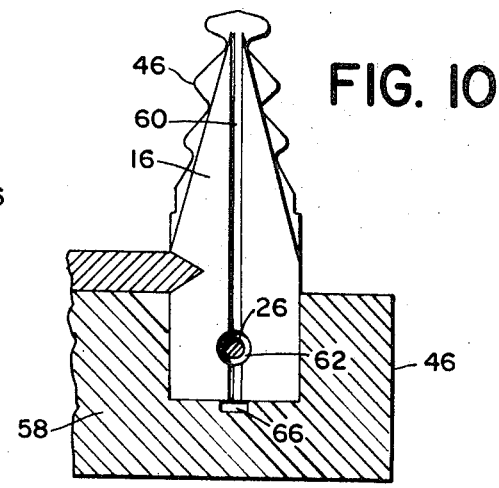

INDIVIDUAL TOOTH BROACH

CROSS-REFERENCE TO RELATED APPLICATION

This invention is a continuation-in-part of U.S. application Ser. No. 716,919 filed Mar. 28, 1968, now U.S. Pat. No. 3,528,154.

BACKGROUND OF THE INVENTION

1. Field of the Invention

This invention relates to broaching tools. More particularly, this invention relates to multiple tooth form broaches particularly adapted for broaching slots, openings or channels of specialized cross section. The invention is particularly useful in forming the so-called "Christmas tree" grooves in turbine disks which are used to mount similarly shaped turbine blade roots, but it will be clearly understood that the invention is not limited to forming such grooves.

2. Description of the Prior Art

The traditional prior art broaching tool has been a stick-type broach in which a number of broaching teeth or teeth sets are formed on a single solid stick. A number of particularly troublesome problems directly attributable to the unitary stick-type construction have been present in the manufacture, use and service of these traditional prior art stick-type broaches. By way of illustration of some of these problems, in the machining operation of the stick-type broaches large machines and extensive setups are required, and the machinery must have the capability of turning out stick-type segments of various lengths. In the heat-treat operation in the manufacture of stick-type broaches a large amount of warpage is encountered due to the extensive length of the stick; cracking occurs resulting in the loss of the entire stick; and nonuniform heat treatment results due to the excessive length of the stick. In the grinding operation in the manufacture of stick-type broaches excessive grinding wheel breakdown is encountered due to the length of the stick, and small diameter wheels must be used for backoff thus leading to excessive wheel breakdown. In the assembly operation in the manufacture of stick-type broaches the quality of the overall stick form is a direct result and function of the operator's skill in forming the entire stick, with the quality of the stick being only as good as the worst tooth, and an undersized tooth results in an overloading, sometimes severely, of the next tooth. In the servicing operation in the use of stick-type broaches a substantial undersizing of a tooth, through wear or otherwise, makes it necessary to discard the entire stick even though there is still useful life left in many or all of the other teeth, and the entire stick is also lost as the result of any tooth damage or crackup with respect to any one tooth or any one part of the stick. The choice of materials from which stick-type broaches have been made has also been restricted by the stick configuration. High-speed steel has been used, but never carbide because carbide is so expensive that a mistake could not be tolerated in forming a stick from a large piece nor could the loss of the entire tool be tolerated because of the failure of one tooth.

Attempts or suggestions have been made in the prior art to overcome some of these deficiencies in the traditional broach structure by forming a broach assembly from several broaching segments, each segment having several teeth; and suggestions have also been made to form a broach from individual teeth inserted in a holder. However, these suggestions have proven to be impracticable for a variety of reasons, principal among which have been that they have lacked the necessary stability for broaching operations and have been particularly susceptible to winking wherein the front ends of the teeth move from side to side because of pressures on the tool.

SUMMARY OF THE INVENTION

The broaching tool of the present invention is formed from a plurality of individual teeth assembled together with a V-groove interlock structure between adjoining teeth. Each tooth has a V-shaped projection on either the top or bottom surface thereof, and the other surface is provided with a correspondingly angled V-shaped notch or recess. Each V-shaped notch or recess has at the base thereof a channel running along substantially the entire length of the notch to serve as an oil-distributing channel, and this main oil-distributing channel may have branch oil-distributing channels extending therefrom to the sides of the groove. The teeth are assembled one upon the other to construct the form broach whereby the protrusions and notches on adjacent teeth interlock, and the assembly is concluded with end structure and a tie rod passing through the base of the interlocking teeth. When assembled in this interlocking relationship, the oil-distributing channel at the base of the V-groove of each tooth forms a slight separation between the tip of the V-projection and the base of the V-groove between adjacent interlocking teeth, and lubricating fluid is distributed to the broach array through these channels to provide lubrication for each of the individual teeth in the broaching array. This construction, especially the interlocking teeth, overcomes the deficiencies encountered in the previously suggested segmented broaches thus making possible, for the first time, a practicable individual tooth-segmented broach assembly which overcomes the numerous disadvantages of a stick-type broach. Considering the aspects of manufacture, use and service previously discussed with respect to the traditional stick-type broach, the individual tooth segmented broach of the present invention offers numerous advances and improvements. In the step of machining in the manufacture of the individual tooth broach, small machines can be used to turn out the individual teeth, the machines being of the type which can be automated, and all of the individual teeth can be initially cast or otherwise formed of uniform size and then ground to size in the cutting area. In the heat-treat operation in the manufacture of the individual tooth broach, stick warpage is eliminated since there is no long stick to heattreat; cracking means loss of a single tooth only; and a uniform heat treat can be quality controlled for the small individual teeth. In the grinding operation in the manufacture of the individual tooth broach, wheel breakdown is controlled because only one tooth is being ground at a time, and large diameter wheels can be used for backoff because there is no adjacent tooth to run into, thus resulting in reduced frequency of wheel breakdown. In the assembly operation in the manufacture of the individual tooth broach, great selectivity can be employed in the choice of the best teeth to be used as finishers, and undersized teeth can either be eliminated or selectively placed at the start of the broach to essentially eliminate overloading due to undersizing. In the servicing of the individual tooth broach, undersized teeth can be easily removed and replaced with new teeth to extend the life of the entire broach assembly, and any one or more teeth involved in a crackup or other tooth damage can also easily be replaced. As a further important consideration, the fact that the consequences of damage or error, either in manufacture, assembly or use, are limited to individual teeth rather than the entire stick, means that expensive but highly desirable materials such as carbide can also be used as the tooth material. The lubrication feature of this present application, whereby lubricating fluid is supplied to the individual teeth in the broaching array via lubricating channels in the base of each V-notch, is a particularly important and advantageous feature. Not only does it provide for lubrication of the entire assembled broaching array, but it also insures that each individual cutting element will receive a definite lubricating fluid supply.

Accordingly, one object of the present invention is to provide a novel and improved form broach.

Still another object of the present invention is to provide a novel and improved individual tooth form broach.

Still another object of the present invention is to provide a novel and improved individual tooth broach in which the individual teeth are assembled in a cooperating interlocking array and in which lubrication-distributing channels are proved in the individual teeth in the array to distribute lubricating fluid to the individual teeth and to the entire broach.

BRIEF DESCRIPTION OF THE DRAWINGS

In the drawings, wherein like elements are numbered alike in the several figures, FIG. 1 is a front view of a broach employing the present invention, the view being shown partly broken to indicate substantial length of the assembly.

FIG. 2 is a side view of the broach of FIG. 1.

FIG. 3 is a perspective view of a broach employing the present invention, the view in FIG. 3 showing several teeth removed for purposes of clarity in illustrating some of the details of the assembly.

FIG. 4 is a view showing retainer assembly structure for use in the present invention.

FIG. 5 is a view showing mounting structure for use with the present invention.

FIG. 6 is a view, looking head on, of one of the teeth of FIG. 5.

FIG. 7 is a view of an alternative configuration for the individual teeth of the present invention incorporating an oil distribution channel.

FIG. 8 is a view similar to FIG. 7 showing another alternative configuration including branch lubrication-distributing channel.

FIG. 9 is a partial view similar to FIG. 1 showing an assembly of the teeth of FIG. 7 with the oil-distributing channels.

FIG. 10 is a view similar to FIG. 5 showing a slot in the ram mounting body to serve as a lubrication-distributing manifold.

DESCRIPTION OF THE PREFERRED EMBODIMENT

Referring now to FIG. 1, a form broach 10 has a plurality of interlocking individual cutting elements in the form of tooth segments 12 extending along the greater part of the length of the broach. Not all of the teeth are shown in detail in FIG. 1, and the broach is shown broken along its length to indicate its extended length, but it will be understood that the individual tooth segments 12 are stacked one upon the other along the entire working length of the broach. The teeth depicted in FIG. 1 are roughing teeth with roughing cutting elements 14 mounted on the front ends of the teeth (see also FIG. 2). As can best be seen in FIG. 2, the cutting elements increase in size from left to right along the length of the broach so that the leftmost end of the assembly is the leading end in the broaching operation.

Viewing the assembly of FIG. 1 as lying on its side, the top surface of each tooth is provided with a V-groove or notch 16 along substantially the full length of the tooth, and the bottom surface of each tooth has a corresponding V-shaped projection 18 along substantially the full length of the tooth. The V-grooves 16 preferably have an included angle of approximately 120° as depicted, and the exterior angle of each V-projection 18 is approximately 240° as depicted so that the V-projections 18 and the V-grooves 16 mate in complete interlocking arrangement. However, it will be understood that other angles could be used in this form of interlocking arrangement. As can best be seen in FIG. 2, the grooves 16 and the projections 18 extend along substantially the entire length of each individual tooth so that the interlocking conjunction between the teeth is present along the entire length of the teeth. Since one surface of each tooth is provided with a V-projection and the other surface of the tooth is provided with a V-groove, each tooth, except the top and bottom teeth in the array, has a bottom V-projection mating and interlocking with a top V-groove in the next lower tooth, and the upper surface of each tooth has a V-groove mating and interlocking with a V-projection in the next upper tooth. The bottom surface of the lowest tooth and the top surface of the uppermost tooth do not mate with adjacent teeth, but they do mate and interlock with retaining structure as will be more fully described so that each tooth in the assembly is fully mated and interlocked at both upper and lower surfaces with appropriately shaped adjacent surfaces. Of course, it will be understood that the V-groove and V-projection arrangement could be reversed so that the projection is on the top surface of each tooth and the groove at the bottom surface of the tooth.

Still referring to FIGS. 1 and 2, and with further reference to FIG. 4, the stack of adjacent and interlocking individual cutting teeth is held together by retaining structure in the form of an interconnected lock block 20 at the top or forward end of the broach and a backup block 22 at the bottom or rear end of the broach. Lock block 20 has a V-projection at the bottom surface thereof to mate with the V-groove in the tooth segment to which it is adjacent, and backup block 22 has a V-groove in its top surface to mate with the V-projection from the tooth segment to which it is adjacent. Each tooth has a hole 24 therein near the root end of the tooth, the holes being in the same relative position in each tooth so that the holes cooperate to form a continuous passageway when the teeth are in alignment to form the broach. Lock block 20 and backup block 22 also have similarly positioned holes, and a tie rod 26 extends from lock block 20 through the roots of all of the teeth 12 and into backup block 22. Lock block 20 has a cylindrically shaped recess 28 and a pair of diametrically opposed side openings 30. A head structure attached to one end of rod 26 consisting of a cylindrical collar 32 and side wings 34 respectively fit in and engage recess 28 and side openings 30. The engagement of collar 32 and wings 34 in recess 28 and side openings 30 can also be clearly seen in the perspective view of FIG. 3. The other end of rod 26 has a threaded portion 36 which projects into a cylindrical recess 38 in backup block 22, and an elongated cylindrical set nut 40 is housed in recess 38 and screws onto threaded portion 36 to complete the retainer structure. The relative sizing of the parts is such that set nut 40 can be screwed tightly onto threaded portion 36 to urge the teeth, the locking block and the backup block together to exert an extremely high compression force along the entire broach assembly. Rod 26 is provided with a flat 42 which engages with a fixed pin 44. The engagement between pin 44 and flat 42 prevents twisting and torquing of rod 26 when nut 40 is being tightened.

The retainer structure described immediately above secures the individual teeth in an assembled relationship and provides a substantial compression force to urge the teeth together. The V-groove interlocking between successive teeth then operates to prevent any relative movement or winking between the teeth so that the assembly has all of the effect of and the advantages of a stick broach without any of the disadvantages thereof and without any of the disadvantages previously present in attempts at individual tooth assemblies.

Referring now to FIG. 3, a perspective is shown of a broach assembly in accordance with the present invention. Merely for purposes of illustration, some of the tooth segments have been omitted so that the construction of an individual tooth can be fully observed along with the relationship between the teeth. The cutting teeth shown in FIG. 3 are provided with the "Christmas tree" serrations 46 so that the broach shown in FIG. 3 is a finishing broach. Thus, it will be understood that the present invention can be employed with roughing broaches such as shown in FIG. 1 or finishing broaches such as shown in FIG. 3; and it will also be understood that any desired successive variation in shape between successive teeth can be employed so that, for example, a transition could be made from roughing the teeth at one end to intermediate teeth at the other or from intermediate teeth to finishing teeth, or even from roughing teeth to finishing teeth if the nature of the operation permitted.

The relationship of the individual teeth 12, both between themselves and with locking block 20 and backup block 22 and rod 26 and collar 32, can be clearly seen in FIG. 3. In addition, the extension of the V-groove 16 along substantially the entire length of tooth segments 12 can clearly be seen in FIG. 3 by virtue of the illustrative removal of some teeth, and it will be understood that the mating V-projection 18 (as seen in the tooth shown in FIG. 6) on the bottom of each tooth also extends along substantially the entire length of the tooth.

Referring now to FIG. 5, the assembly broach 10 would be mounted in a conventional ram body 48 for the broaching operation. In order to insure proper securing of the broach 10 in ram body 48, each tooth segment has a 45° V-notch 50 formed on one side thereof, and a correspondingly V-shaped clamping bar fits into notch 50 and is secured to the ram body by screw 50. The interaction between bar 52 and notch 50 forces the broach assembly against surfaces 56 and 58 in the ram body to securely retain broach 10 in the ram body. Thus, additional stability is achieved.

Referring now to FIG. 7, a tooth segment 12 is shown which is essentially identical to the individual tooth segments disclosed and described above with the exception that it has a channel 60 running along the longitudinal length of the tooth at the juncture of the inclined surfaces forming V-groove 16. In addition, the through-hole 24 in the root end of each tooth is slightly countersunk to form an enlarged opening 62 at the top of hole 24 in the vicinity of the puncture of the V-groove 16 in each tooth. Channel 60 is interrupted by enlarged opening 62 so that channel 60 communicates with enlarged opening 62 at diametrically opposed locations. The channel 60 and enlargement 62 provide a flow path for the delivery of lubricating fluid along the length of each of the cutting teeth in an array from the root end to the forward end of the tooth.

Referring now to FIG. 8, still another modification is shown for the construction of the lubrication feature on each of the individual teeth. The tooth shown in FIG. 8 contains all of the features shown and described with respect to FIG. 7 and, in addition, has a plurality of branch channels 64 leading from longitudinal channel 60 outward along the inclined surfaces of V-groove 16 to the sides of the cutting tip. Branch channels 64 provide a supply of lubricating fluid to the sides of each cutting element as well as to the forward end thereof to provide added assurance that a supply of lubricating fluid will be delivered to the serrations 46.

Referring now to FIG. 9, a view similar to FIG. 1 is shown of several cutting teeth in a broaching array wherein the teeth have the lubrication feature of either FIG. 7 or FIG. 8. As seen in FIG. 9, the main channel 60 provides a gap between each V-projection 18 and each V-groove 16 at the intersection of the inclined sides of each. This gap afforded by channel 60 in no way impairs the stability and other advantageous features of the embodiments which do not have the lubrication channel since full interlocking engagement is still provided between the V-notches and V-grooves along substantially the entire length of the cutting elements, but the channel does provide an especially advantageous route for the deliver of lubricating fluid Of course, it will be understood that either the FIG. 7 or FIG. 8 embodiment or other similar arrangements can be employed in the array of FIG. 9.

Referring now to FIG. 10, a view similar to FIG. 5 is shown with a slight modification in ram body 48 to provide for delivery of lubricating fluid. Also, it will be noted that FIG. 10 is taken through a cutting element so that opening enlargement 46 may be seen. As shown in FIG. 10, ram body 48 has a slot 66 formed in back surface 58 along part or all of the length thereof. Slot 66 communicates with main channel 60 in each of the cutting teeth whereby slot 66 serves as a lubrication manifold. The lubricating fluid is delivered to slot 66 and flows down through slot 66 and into the end of each channel 60 communicating with slot 66. The lubricating then flows along channel 60 to enlarged section 62 of each through-hole 24 where it then flows around through-rod 26 and then along the remaining length of channel 60 to the forward tip of the cutting element (and, of course, also along the branch channels 64 if they are present).

Although the foregoing discussion has been directed to a V-groove and V-projection interlock, it will be understood that the invention is not limited to this form of interlock. Any equivalent interlock contoured shape could also be employed to provide interlocking and support between adjacent inserts along their length, such as serrations along the length of the inserts, radial surfaces along the length of the inserts or tongue and groove along the length of the inserts, and appropriate channels can be provided in any such serrations or grooves or other similar configurations for the delivery of lubricating fluid.

From the foregoing description and discussion it can be seen that the present invention produces a practicable and effective segmented tooth form broach composed of individual tooth segments. Broach stability is insured and winking is eliminated by the V-groove and V-projection interlock between the teeth in the broach.

While a preferred embodiment has been shown and described, various modifications and substitutions may be made without departing from the spirit and scope of this invention. Accordingly, it is to be understood that this invention has been described by way of illustration rather than limitation.

What is claimed is:

1. A segmented broach including:
   a plurality of cutting elements, each of said cutting elements having a body with a top and bottom surfaces;
   retaining means for securing said cutting elements in a broaching array;
   a contoured recess on one of said top and bottom surfaces of each of said cutting elements and a contoured projection on the other of said surfaces, said recess and said projection being of mating shape for interconnecting said cutting elements in interlocking relationship in said broaching array, said contoured recess and said contoured projection extending along substantially the full length of said body; and
   channel means in the contoured recess in at least some of said cutting elements for supplying lubricating fluid to said cutting elements.

2. A segmented broach as in claim 1 wherein:
   said channel means includes a channel along the base of said contoured recess.

3. A segmented broach as in claim 2 wherein:
   said contoured recess is a V-groove and said contoured projection is a mating V-projection said channel being at the base of said V-groove.

4. A segmented broach as in claim 1 including branch lubrication supply channels extending from said channel.

5. A segmented broach as in claim 1 including:
   a ram body for said broaching array; and
   manifold means in said ram body communicating with said channel means to deliver lubricating fluid to said cutting elements.

6. A cutting element for a broach, the cutting element having:
   a body with top and bottom surfaces and at least one contoured cutting surface between said top and bottom surfaces;
   a contoured recess on one of said top and bottom surfaces;
   a contoured projection of the other of said top and bottom surfaces, said contoured recess and contoured projection being of interlocking shape and extending along substantially the entire length of said body; and
   channel means in said contoured recess for supplying lubricating fluid to said cutting surface.

7. A cutting element as in claim 6 wherein:
   said contoured recess is a V-groove and said contoured projection is a corresponding V-projection, said channel means being a channel in said V-groove.

8. A cutting element as in claim 6 including:
   branch lubrication supply channels extending from said channel means.

9. A cutting element as in claim 6 including:
   an opening through said cutting element near the root of said cutting element and through said top and bottom surfaces, said channel communicating with said opening.

10. A segmented broach including:
a plurality of cutting elements;
retaining means for securing said cutting elements in a broaching array;
a first V-groove contoured shape on one surface of each of said cutting elements and a second mating V-projection contoured shape on another surface of each of said cutting elements for interconnecting said cutting elements in interlocking relationship in said broaching array; and
supply means in at least some of said cutting elements for supplying lubricating fluid to said cutting elements, said supply means including a channel at the base of the V-groove contoured surface of some of the cutting elements.

11. A segmented broach as in claim 10 wherein:
said V-groove, said V-projection and said channel extend along the length of said cutting elements.

12. A segmented broach as in claim 10 including branch lubrication supply channels extending from said supply channel.

13. A segmented broach as in claim 10 including:
a ram body for said broaching array; and
manifold means in said ram body communicating with said supply means to deliver lubricating fluid to said cutting elements.

14. A cutting element for a broach including:
a cutting tooth portion;
a top surface having a V-groove contour;
a bottom surface having a V-projection contours, said V-groove and said V-projection being of a mating shape; and
channel means in said V-groove contoured surface for supplying lubricating fluid to said cutting tooth portion.

15. A cutting element for a broach as in claim 14 wherein:
said V-groove contour extends along the length of said top surface and said V-projection contour extends along the length of said bottom surface, and said channel means extends along the length of said top surface.

16. A cutting element as in claim 14 including:
branch lubrication supply channels extending from said channel.

17. A cutting element as in claim 14 including:
an opening through said cutting element near the root of said cutting element and through said top and bottom surfaces, said channel communicating with said opening.

* * * * *